US010122894B2

(12) United States Patent
Tsukano

(10) Patent No.: US 10,122,894 B2
(45) Date of Patent: Nov. 6, 2018

(54) NON-TRANSITORY COMPUTER READABLE RECORDING MEDIUM STORED WITH COLOR VERIFICATION OPTIMIZATION PROGRAM, COLOR VERIFICATION OPTIMIZATION APPARATUS, AND COLOR VERIFICATION OPTIMIZATION METHOD

(71) Applicant: Konica Minolta, Inc., Tokyo (JP)

(72) Inventor: Toshiki Tsukano, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/499,319

(22) Filed: Apr. 27, 2017

(65) Prior Publication Data
US 2017/0318193 A1 Nov. 2, 2017

(30) Foreign Application Priority Data

Apr. 28, 2016 (JP) .................................. 2016-091641

(51) Int. Cl.
*H04N 1/60* (2006.01)
*H04N 1/00* (2006.01)

(52) U.S. Cl.
CPC ....... *H04N 1/6008* (2013.01); *H04N 1/00005* (2013.01); *H04N 1/00023* (2013.01); *H04N 1/00037* (2013.01); *H04N 1/00074* (2013.01); *H04N 1/603* (2013.01); *H04N 1/6097* (2013.01); *H04N 2201/0094* (2013.01)

(58) Field of Classification Search
None
See application file for complete search history.

(56) References Cited

U.S. PATENT DOCUMENTS

| 2014/0192371 | A1 | 7/2014 | Teraue | |
| 2016/0044209 | A1* | 2/2016 | Tsukano | H04N 1/60 358/1.9 |
| 2017/0054877 | A1* | 2/2017 | Shibata | H04N 1/6019 |
| 2017/0201652 | A1* | 7/2017 | Hirano | G06K 15/1836 |

FOREIGN PATENT DOCUMENTS

JP 2014/135602 A 7/2014

* cited by examiner

*Primary Examiner* — Barbara Reinier
(74) *Attorney, Agent, or Firm* — Osha Liang LLP

(57) ABSTRACT

A color verification optimization program causes a computer to execute a process including steps of, when a plurality of color conversion patterns are extracted, determining whether one color conversion profile and another color conversion profile coincide with or approximate to each other by comparing color saturation values which are estimated with respect to color conversion profiles, determining whether one color correction table and another color correction table coincide with or approximate to each other by comparing color saturation values which are estimated with respect to color correction tables, and performing control to perform verification on one color conversion pattern in two or more color conversion patterns of which the color conversion profiles and the color correction tables both coincide with or approximate to each other and omit the verification with respect to a remaining color conversion pattern.

17 Claims, 12 Drawing Sheets

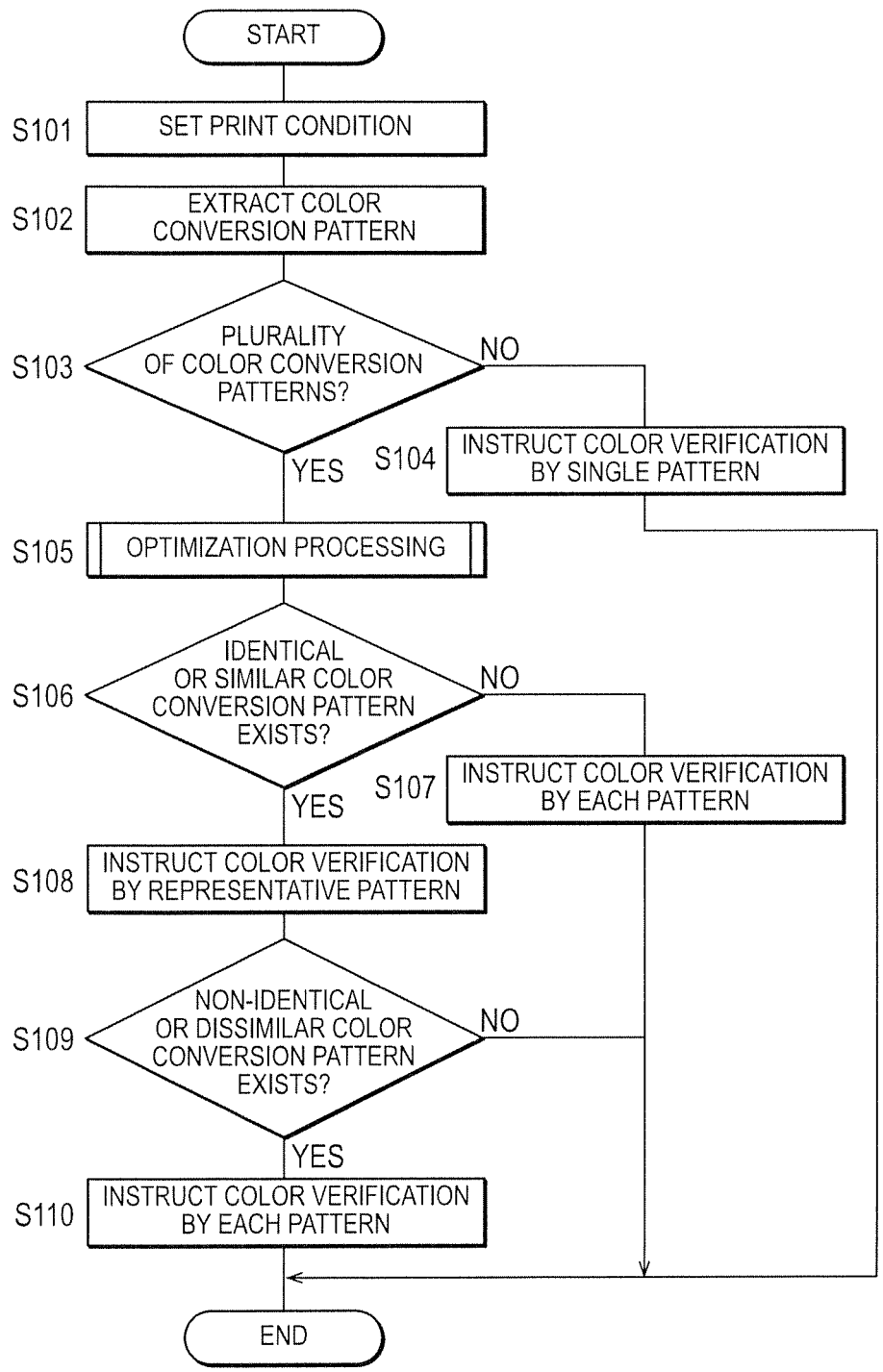

FIG.8

| COLOR CONVERSION PATTERN | SHEET TYPE | COLOR CONVERSION PROFILE | COLOR CORRECTION TABLE | NECESSITY OF COLOR VERIFICATION |
|---|---|---|---|---|
| 1 | PLAIN PAPER | PROFILE A | COLOR CORRECTION TABLE W | |
| 2 | COLOR SHEET | PROFILE A' | COLOR CORRECTION TABLE X | |
| 3 | A SHEET | PROFILE B | COLOR CORRECTION TABLE Y | |
| 4 | B SHEET | PROFILE B | COLOR CORRECTION TABLE Z | |

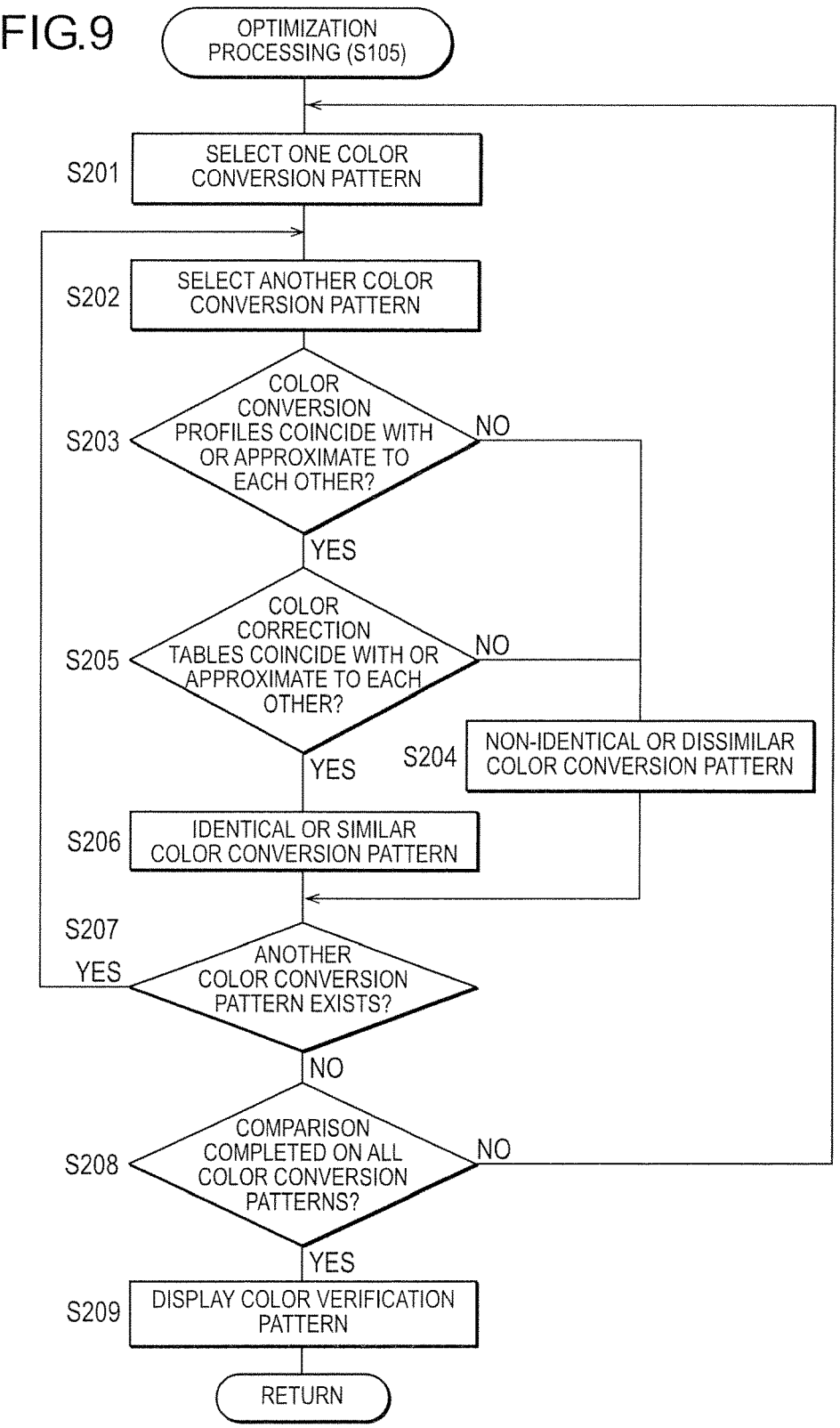

FIG.10

| ALLOWABLE LEVEL | THRESHOLD VALUE (COLOR DIFFERENCE) |
|---|---|
| STRICT | 2.0 |
| NORMAL | 3.0 |
| MILD | 4.0 |

| COLOR CONVERSION PATTERN | SHEET TYPE | COLOR CONVERSION PROFILE | COLOR CORRECTION TABLE | NECESSITY OF COLOR VERIFICATION |
|---|---|---|---|---|
| 1 | PLAIN PAPER | PROFILE A | COLOR CORRECTION TABLE W | ☑ |
| 2 | COLOR SHEET | PROFILE A' | COLOR CORRECTION TABLE X | |
| 3 | A SHEET | PROFILE B | COLOR CORRECTION TABLE Y | ☑ |
| 4 | B SHEET | PROFILE B | COLOR CORRECTION TABLE Z | |

FIG.12

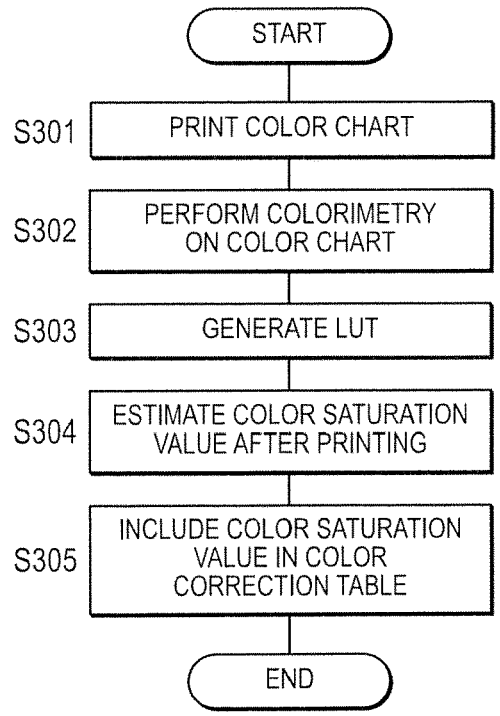

NON-TRANSITORY COMPUTER READABLE RECORDING MEDIUM STORED WITH COLOR VERIFICATION OPTIMIZATION PROGRAM, COLOR VERIFICATION OPTIMIZATION APPARATUS, AND COLOR VERIFICATION OPTIMIZATION METHOD

CROSS-REFERENCE TO RELATED APPLICATION

This application is based on Japanese Patent Application No. 2016-091641 filed on Apr. 28, 2016, the contents of which are incorporated herein by reference.

BACKGROUND

1. Technical Field

The present invention relates to a non-transitory computer readable recording medium stored with a color verification optimization program, a color verification optimization apparatus, and a color verification optimization method.

2. Description of Related Art

Printing apparatuses such as color Multi-Function Peripherals (MFPs) perform color conversion processing for accurately reproduce colors of color images. In the color conversion processing, a color value of print data is converted into a color value specific to the printing apparatus by applying a color conversion profile, and then the color value after color conversion is further corrected by applying a color correction table generated for maintaining the output of the printing apparatus constant. The color conversion profile and the color correction table include look-up tables and are generated more than one according to types of sheets and the like.

When the printing apparatus executes the color conversion processing and performs printing, the color conversion processing using the color conversion profile and the color correction table is verified prior to a start of printing. Specifically, the color conversion processing is executed on a combination of the color conversion profile and the color correction table used in a print job, and a color chart is printed. Subsequently, the color chart is subjected to colorimetry to confirm whether a color difference between a colorimetry value of the color chart and a target value falls within a standard. However, when there are a plurality of combinations of the color conversion profiles and the color correction tables used in a print job, it is not desirable to perform verification on all of the combinations since doing so takes a long processing time and increases the number of waste sheets.

In this regard, Japanese Laid-open Patent Publication No. 2014-135602 discloses a technique for grouping two or more types of sheets, performing calibration only on a profile corresponding to a representative sheet, and performing batch update on profiles corresponding to remaining sheets based on the calibration result. According to this technique, profile calibration can be omitted with respect to the sheets other than the representative sheet in the two or more types of sheets belonging to the same group.

However, the above-described technique performs grouping based on the type of the sheets, and thus there is a possibility that accuracy of the grouping is not sufficient. When the grouping is not performed correctly, the accuracy of the profile is rather deteriorated by the batch update of the profiles and print quality is deteriorated.

SUMMARY

The present invention is made in consideration of the above-described problems. Thus, one or more embodiments of the present invention provide a non-transitory computer readable recording medium stored with a color verification optimization program, a color verification optimization apparatus, and a color verification optimization method, which can accurately group color conversion patterns which are combinations of color conversion profiles and color correction tables and minimize the number of verification times of color conversion processing while maintaining print quality.

A non-transitory computer readable recording medium reflecting one aspect of the present invention is a non-transitory computer readable recording medium stored with a color verification optimization program for optimizing verification of color conversion processing by a color conversion pattern which is a combination of a color conversion profile for converting a color value of print data into a color value specific to a printing apparatus and a color correction table for correcting a color value converted by applying the color conversion profile, the program causing a computer to execute a process which includes the steps of (a) analyzing a setting of a print job and extracting the color conversion pattern used in the print job, (b) determining whether one of the color conversion profile and another of the color conversion profile coincide with or approximate to each other by comparing color saturation values after printing which are estimated with respect to the color conversion profiles, (c) determining whether one of the color correction table and another of the color correction table coincide with or approximate to each other by comparing color saturation values after printing which are estimated with respect to the color correction tables, (d) in a case where a plurality of the color conversion patterns are extracted in the step (a), calculating two or more of the color conversion patterns in which the color conversion profiles and the color correction tables both coincide with or approximate to each other based on determination results in the step (b) and the step (c), and (e) performing control to perform the verification by one color conversion pattern in the two or more color conversion patterns calculated in the step (d) and omit the verification with respect to a remaining color conversion pattern.

In one or more embodiments, according to the above-described non-transitory computer readable recording medium, the process further includes, between the step (d) and the step (e), the step of (f) displaying the one color conversion pattern and the remaining color conversion pattern in a distinguishable manner with respect to the two or more color conversion patterns calculated in the step (d).

In one or more embodiments, according to the above-described non-transitory computer readable recording medium, the process further includes the steps of (g) in a case where it is determined in the step (b) that the color conversion profiles do not coincide with or approximate to each other, recognizing a color value of which the color saturation values after printing are different between the color conversion profiles, (h) specifying color values used in the print job, and (i) determining whether the color value recognized in the step (g) and a color value around the relevant color value are included in the color values specified in the step (h), wherein, in a case where it is determined in the step (i) that the color value recognized in the step (g)

and the color value around the relevant color value are not included in the color values specified in the step (h), it is determined that the color conversion profiles coincide with or approximate to each other.

In one or more embodiments, according to the above-described non-transitory computer readable recording medium, the process further includes the steps of (j) in a case where it is determined in the step (c) that the color correction tables do not coincide with or approximate to each other, recognizing a color value of which the color saturation values after printing are different between the color correction tables, (k) specifying color values used in the print job, and (l) determining whether the color value recognized in the step (j) and a color value around the relevant color value are included in the color values specified in the step (k), wherein, in a case where it is determined in the step (l) that the color value recognized in the step (j) and the color value around the relevant color value are not included in the color values specified in the step (k), it is determined that the color correction tables coincide with or approximate to each other.

In one or more embodiments, according to the above-described non-transitory computer readable recording medium, the color conversion profile and the color correction table are associated with settings regarding color conversion parameters, and it is determined, in the step (b) and the step (c), whether the settings regarding the color conversion parameters coincide with each other together with the color saturation values.

In one or more embodiments, according to the above-described non-transitory computer readable recording medium, the process further includes the steps of (m) in a case where a verification result of the one color conversion pattern is defective in the step (e), adjusting the color correction table of the one color conversion pattern based on the verification result, and (n) reflecting a difference between the color correction table before adjustment of the one color conversion pattern and the color correction table of the remaining color conversion pattern in the color correction table adjusted in the step (m) and generating a new color correction table of the remaining color conversion pattern.

In one or more embodiments, according to the above-described non-transitory computer readable recording medium, a threshold value for determining whether the color conversion profiles or the color correction tables coincide with or approximate to each other is determined in the step (b) and the step (c) according to an allowable level set to the verification.

In one or more embodiments, according to the above-described non-transitory computer readable recording medium, wherein the process further includes the step of (o) storing the two or more color conversion patterns calculated in the step (d) so as to omit the step (b) and the step (c) in a case where a new print job is executed.

Other aspects and advantages of this invention will become apparent from the description given herein below with reference to the embodiments illustrated in the accompanying drawings.

BRIEF DESCRIPTION OF THE DRAWINGS

FIG. 7 is a flowchart illustrating procedures of color verification processing executed by the PC.

FIG. 8 illustrates an example of a color conversion pattern extracted from a print job.

FIG. 9 is a flowchart illustrating procedures of optimization processing.

FIG. 10 illustrates an example of allowable levels.

FIG. 11 illustrates an example of a color verification pattern display screen.

FIG. 12 is a flowchart illustrating procedures of color correction table generation processing.

DETAILED DESCRIPTION

The embodiments of the present invention will be described in detail below with reference to the drawings.

First Embodiment

Figure 1:
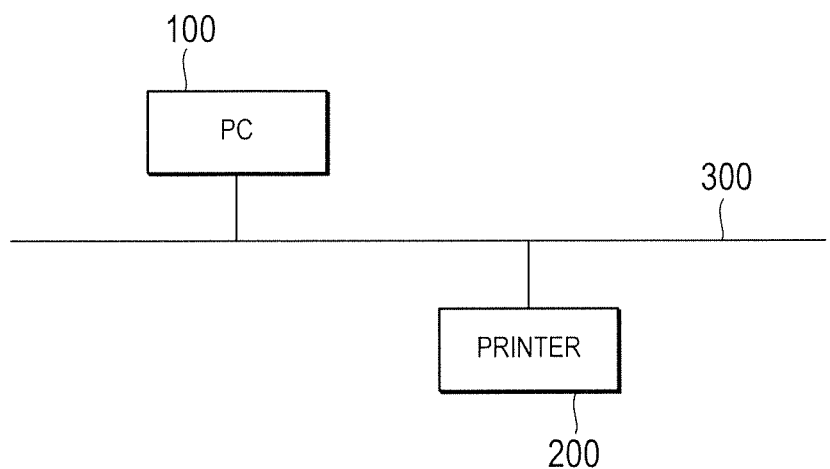
FIG. 1 is a block diagram illustrating an entire configuration of a printing system according to a first embodiment of the present invention.

FIG. 1 is a block diagram illustrating an entire configuration of a printing system according to a first embodiment of the present invention. The printing system includes a personal computer (PC) 100 and a printer 200. The PC 100 and the printer 200 are communicably connected with each other via a network 300.

The network 300 is constituted of a local area network (LAN) connecting a computer and a network device with each other by the standards such as Ethernet, Fiber Distributed Data Interface (FDDI), and Wireless Fidelity (Wi-Fi), a Wide Area Network (WAN) connecting the LANs with each other by a leased line, and the like. Types and the number of devices connected to the network 300 are not limited to the example illustrated in FIG. 1.

Figure 2:
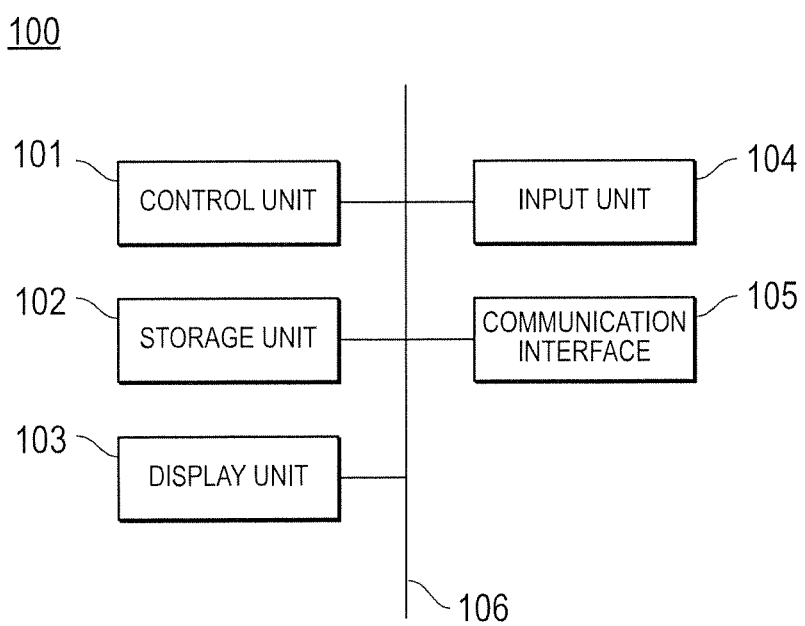
FIG. 2 is a block diagram illustrating a schematic configuration of a personal computer (PC).

FIG. 2 is a block diagram illustrating a schematic configuration of the PC 100. The PC 100 includes a control unit 101, a storage unit 102, a display unit 103, an input unit 104, and a communication interface 105 as a color verification optimization apparatus, and these units are connected with each other via a bus 106 for exchanging signals.

The control unit 101 is a Central Processing Unit (CPU) and performs control of each of the abovementioned units and various arithmetic operations according to programs. The storage unit 102 is constituted of a read only memory (ROM) for storing various programs and various data pieces in advance, a random access memory (RAM) for temporarily storing a program and data as a work area, a hard disk for storing various programs and various data pieces, and the like.

The display unit 103 is, for example, a liquid crystal display and displays various information pieces. The input unit 104 includes a pointing device such as a mouse and a keyboard and is used to perform various inputs.

The communication interface 105 is an interface for communicating with other devices via the network 300, and the standards such as Ethernet, FDDI, and Wi-Fi are adopted.

Figure 3:
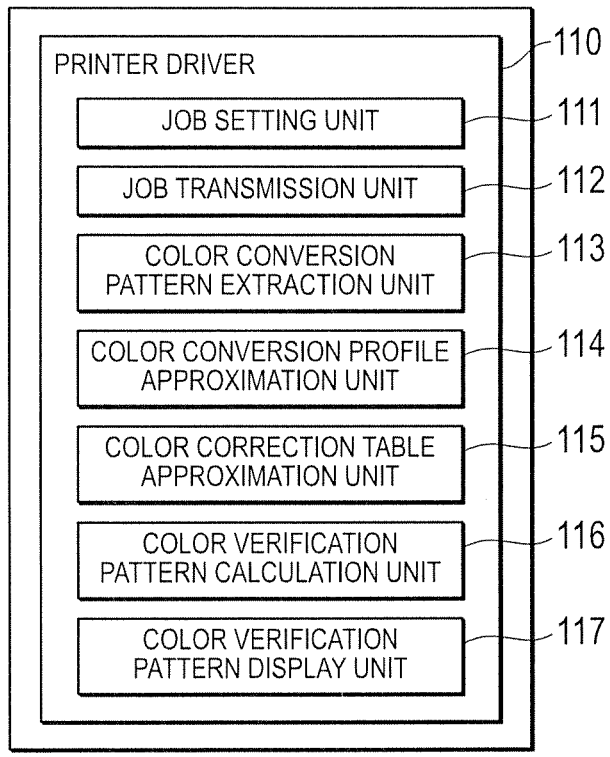
FIG. 3 illustrates contents stored in a storage unit of the PC.

FIG. 3 illustrates contents stored in the storage unit 102 of the PC 100. The storage unit 102 of the PC 100 stores a printer driver 110 for generating print data.

The printer driver 110 stores programs corresponding to a job setting unit 111, a job transmission unit 112, a color conversion pattern extraction unit 113, a color conversion profile approximation unit 114, a color correction table approximation unit 115, a color verification pattern calculation unit 116, and a color verification pattern display unit 117. The job setting unit 111 sets print conditions of a color conversion profile, a color correction table, and the like. The job transmission unit 112 transmits a print job to the printer 200. The color conversion pattern extraction unit 113 analyzes a print setting and extracts a color conversion pattern which is a combination of the color conversion profile and the color correction table. The color conversion profile approximation unit 114 determines whether one color conversion profile and another color conversion profile coincide with or approximate to each other as a first determination unit. The color correction table approximation unit 115 determines whether one color correction table and another color correction table coincide with or approximate to each other as a second determination unit. The color verification pattern calculation unit 116 calculates two or more color conversion patterns of which the color conversion profiles and the color correction tables both coincide with or approximate to each other. The color verification pattern display unit 117 displays the color conversion pattern subjected to the color verification and the color conversion pattern omitted from the color verification in a distinguishable manner. Functions of each of the above-described units are fulfilled by the control unit 101 executing programs corresponding to the respective units.

Figure 4:
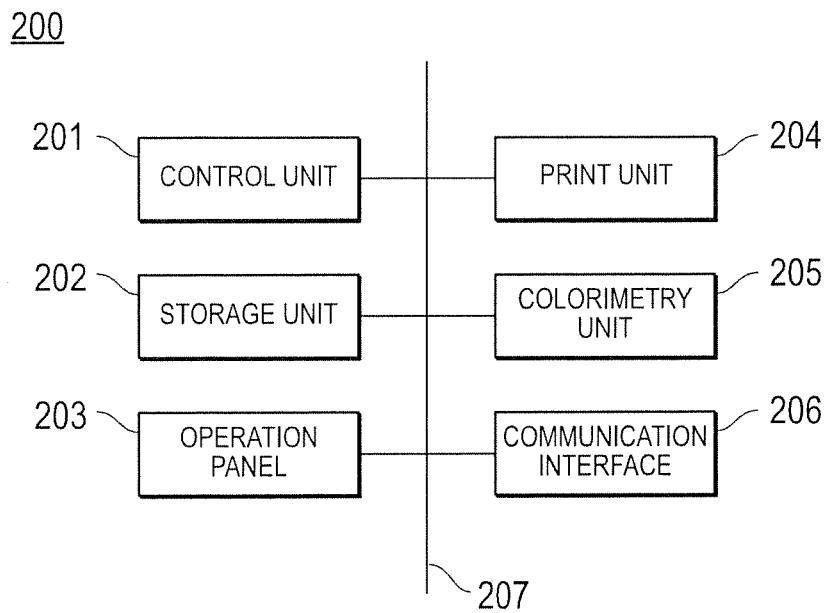
FIG. 4 is a block diagram illustrating a schematic configuration of a printer.

FIG. 4 is a block diagram illustrating a schematic configuration of the printer 200. The printer 200 includes a control unit 201, a storage unit 202, an operation panel 203, a print unit 204, a colorimetry unit 205, and a communication interface 206 as a printing apparatus, and these units are connected with each other via a bus 207 for exchanging signals. In the above-described units of the printer 200, a description is omitted with respect to a part having a function similar to that of each of the above-described units of the PC 100.

The operation panel 203 includes a touch panel, numeric keys, a start button, a stop button, and the like and is used for displaying various information pieces and inputting various instructions.

The print unit 204 uses an electrophotographic type process to print an image based on various data pieces on a sheet. The print unit 204 prints an image using toners of four basic colors, i.e., cyan (C), magenta (M), yellow (Y), and black (K).

The colorimetry unit 205 performs colorimetry on the image printed on the sheet by the print unit 204. The colorimetry unit 205 is, for example, a spectral colorimeter which performs colorimetry on the image on the sheet and obtains a color saturation value (L*a*b* value).

Figure 5:
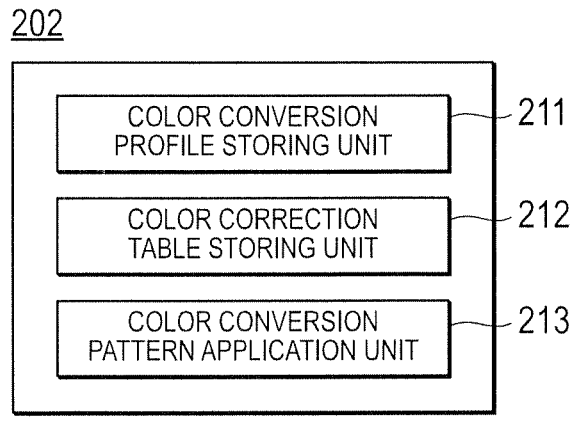
FIG. 5 illustrates contents stored in a storage unit of the printer.

FIG. 5 illustrates contents stored in the storage unit 202 of the printer 200. The storage unit 202 of the printer 200 includes a color conversion profile storing unit 211 and a color correction table storing unit 212. The storage unit 202 stores a program corresponding to a color conversion pattern application unit 213.

Figure 6A:
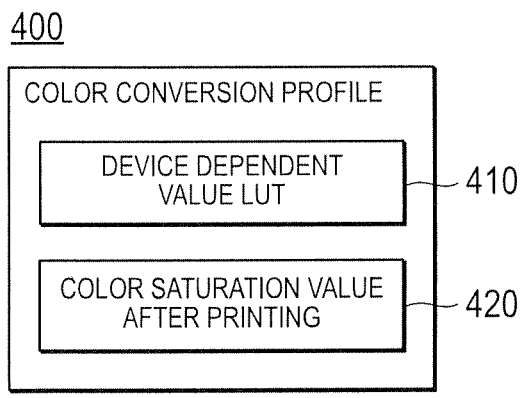
FIG. 6A illustrates a schematic configuration of a color conversion profile.

The color conversion profile storing unit 211 stores a plurality of color conversion profiles 400 (see FIG. 6A). The color conversion profile 400 includes a look-up table (hereinbelow, referred to as an "LUT") for converting a color value (CMYK value) of print data into a color value specific to the printer 200 and is generated according to types of sheets and objects. The plurality of color conversion profiles 400 is generated only once, for example, when the printer 200 is installed.

Figure 6B:
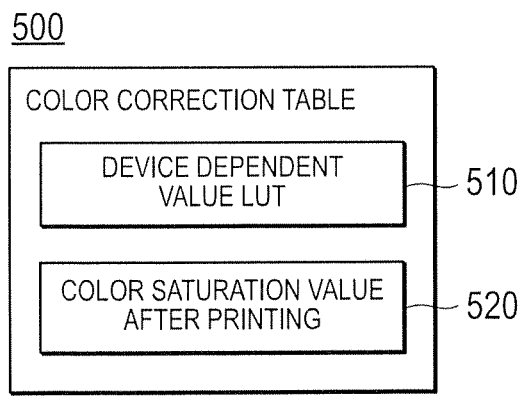
FIG. 6B illustrates a schematic configuration of a color correction table.

The color correction table storing unit 212 stores a plurality of color correction tables 500 (see FIG. 6B). The color correction table 500 includes an LUT for further correcting the color value of the print data converted by applying the color conversion profile 400 and is generated according to types of sheets and objects. The plurality of color correction tables 500 is generated on a daily basis to maintain output of the printer 200 constant.

The color conversion pattern application unit 213 executes color conversion processing by the color conversion pattern. The color conversion pattern application unit 213 converts the color value of the print data into the color value specific to the printer 200 by applying the color conversion profile 400. Further, the color conversion pattern application unit 213 applies the color correction table 500 and corrects the color value converted by applying the color conversion profile 400. A function of the color conversion pattern application unit 213 is fulfilled by the control unit 201 executing a corresponding program.

FIG. 6A illustrates a schematic configuration of the color conversion profile 400, and FIG. 6B illustrates a schematic configuration of the color correction table 500.

As illustrated in FIG. 6A, the color conversion profile 400 includes an LUT 410 and a color saturation value 420 after printing (after output) which is estimated with respect to the LUT 410. The LUT 410 is an LUT for converting the color value of the print data into the color value specific to the printer 200. The color saturation value 420 after printing represents a color saturation value (L*a*b* value) of an output color which is estimated when printing is performed by converting a predetermined input color value (CMYK value) by applying the LUT 410. The color saturation value 420 after printing includes a plurality of color saturation values corresponding to a plurality of (i.e., several hundreds of) input color values. The color saturation value 420 after printing is estimated from a colorimetry value (L*a*b* value) of a color chart which is printed when the color conversion profile 400 is generated and the LUT 410 generated using the relevant colorimetry value, and an actual colorimetry result is reflected in the color saturation value 420 after printing. The color conversion profile 400 includes settings (not illustrated) regarding color conversion parameters of solid preservation processing, middle tone muddiness removal processing, and the like.

Similarly, the color correction table 500 includes an LUT 510 and a color saturation value 520 after printing which is estimated with respect to the LUT 510 as illustrated in FIG. 6B. The LUT 510 is an LUT for correcting the color value of the print data color-converted by applying the color conversion profile 400 and includes a one dimensional LUT and a multidimensional LUT. The color saturation value 520 after printing represents the color saturation value of the output color which is estimated when printing is performed by converting the predetermined input color value by applying the LUT 510. The color saturation value 520 after printing includes a plurality of color saturation values corresponding to a plurality of (i.e., several hundreds of) input color values. The color saturation value 520 after printing is estimated from a colorimetry value of a color chart which is printed when the color correction table 500 is generated and the LUT 510 generated using the relevant colorimetry value, and an actual colorimetry result is reflected in the color saturation value 520 after printing. The color correction table 500 includes settings (not illustrated) regarding color conversion parameters of solid preservation processing, middle tone muddiness removal processing, and the like.

The PC 100 and the printer 200 may include a component other than the above-described components or do not have to include each part of the above-described components.

The printing system constituted as described above performs, for example, verification of color conversion processing by the color conversion pattern which is the combination of the color conversion profile 400 and the color correction table 500 before a print job is executed. Operations of the printing system according to the present embodiment are described below with reference to FIG. 7 to FIG. 14.

FIG. 7 is a flowchart illustrating procedures of the color verification processing executed by the PC 100. An algorithm represented by the flowchart in FIG. 7 is stored as a program in the storage unit 102 of the PC 100 and executed by the control unit 101.

First, the PC 100 sets a print condition of print data (step S101). More specifically, the PC 100 sets a print condition input by a user via a print setting screen (not illustrated). In this regard, the color conversion pattern which is the combination of the color conversion profile 400 and the color correction table 500 is set according to a type (page) of a sheet.

Next, the PC 100 analyzes the print setting and extracts the color conversion pattern used in the print job (step S102).

FIG. 8 illustrates an example of the color conversion pattern extracted from the print job. In FIG. 8, first to fourth color conversion patterns are extracted from the print job. The first color conversion pattern is a color conversion pattern which is a combination of a "color conversion profile A" and a "color correction table W" and is set to "plain paper". The second color conversion pattern is a color conversion pattern which is a combination of a "color conversion profile A'" and a "color correction table X" and is set to a "color sheet". The third color conversion pattern is a color conversion pattern which is a combination of a "color conversion profile B" and a "color correction table Y" and is set to an "A sheet". The fourth color conversion pattern is a color conversion pattern which is a combination of the "color conversion profile B" and a "color correction table Z" and is set to a "B sheet".

Next, the PC 100 determines whether a plurality of the color conversion patterns are extracted (step S103).

When a plurality of the color conversion patterns are not extracted (NO in step S103), the PC 100 instructs color verification by a single pattern (step S104) and terminates the processing. More specifically, the PC 100 instructs the printer 200 to perform the color verification by one color conversion pattern used in the print job and terminates the processing. For example, when the color conversion pattern used in the print job is only the above-described first color conversion pattern, the PC 100 instructs the printer 200 to perform the color verification by the first color conversion pattern and terminates the processing. The printer 200 received the instruction from the PC 100 performs the color verification by the first color conversion pattern. Specifically, the printer 200 first executes the color conversion processing by sequentially applying the "color conversion profile A" and the "color correction table W" and prints the color chart. Subsequently, the printer 200 performs colorimetry on the color chart and confirms whether a color difference between a colorimetry value and a target value falls within a standard.

On the other hand, when a plurality of the color conversion patterns are extracted in the processing in step S103 (YES in step S103), the PC 100 executes optimization processing (step S105). More specifically, the PC 100 executes the optimization processing for calculating the two or more color conversion patterns of which the color conversion profiles and the color correction tables both coincide with or approximate to each other from among the plurality of the color conversion patterns used in the print job. The optimization processing in step S105 will be described in detail later.

Next, the PC 100 determines whether identical or similar color conversion patterns exist (step S106). More specifically, the PC 100 determines whether the two or more color conversion patterns of which the color conversion profiles and the color correction tables both coincide with or approximate to each other are calculated by the optimization processing in step S105.

When the identical or the similar color conversion patterns do not exist (NO in step S106), the PC 100 instructs the color verification by each pattern (step S107) and terminates the processing. More specifically, the PC 100 instructs the printer 200 to perform the color verification by a plurality of the color conversion patterns used in the print job and terminates the processing. For example, when the color conversion pattern used in the print job is the above-described first to fourth color conversion patterns, and these color conversion patterns are not identical or similar to each other, the PC 100 instructs the printer 200 to perform the color verification by the first to the fourth color conversion patterns and terminates the processing. The printer 200 received the instruction from the PC 100 performs the color verification by each of the first to the fourth color conversion patterns.

On the other hand, when the identical or the similar color conversion patterns exist in the processing in step S106 (YES in step S106), the PC 100 instructs the color verification by a representative pattern (step S108). More specifically, the PC 100 regards one color conversion pattern in the two or more identical or similar color conversion patterns as the representative pattern and instructs the printer 200 to perform the color verification by the representative pattern. For example, when the above-described first color conversion pattern is identical or similar to the above-described second color conversion pattern, the PC 100, for example, instructs the color verification by the first color conversion pattern but does not instruct the color verification by the second color conversion pattern. Further, when the above-described third color conversion pattern is identical or similar to the above-described fourth color conversion pattern, the PC 100, for example, instructs the color verification by the third color conversion pattern but does not instruct the color verification by the fourth color conversion pattern. The printer 200 received the instruction from the PC 100 performs the color verification only by the first color conversion pattern and the third color conversion pattern.

Next, the PC 100 determines whether a non-identical or dissimilar color conversion pattern exists (step S109). More specifically, the PC 100 determines whether the color conversion pattern other than the two or more identical or similar color conversion patterns exists in the plurality of the color conversion patterns used in the print job.

When the non-identical or the dissimilar color conversion pattern does not exist (NO in step S109), the PC 100 terminates the processing. On the other hand, when the non-identical or the dissimilar color conversion pattern exists (YES in step S109), the PC 100 instructs the color verification by each pattern (step S110) and terminates the processing. More specifically, the PC 100 instructs the printer 200 to perform the color verification by the color conversion pattern other than the two or more identical or similar color conversion patterns and terminates the processing.

As described above, according to the processing in the flowchart illustrated in FIG. 7, the color conversion pattern used in the print job is extracted, and when there are a plurality of the extracted color conversion patterns, the two or more identical or similar color conversion patterns are calculated. Subsequently, the color verification is performed by one color conversion pattern in the two or more color conversion patterns, and the remaining color conversion patterns are omitted from the color verification. According to such a configuration, the number of times of the color verification is minimized. Accordingly, the processing time is shortened, and the number of waste sheets is reduced.

Next, the optimization processing in step S105 in FIG. 7 is described in detail with reference to FIG. 9. FIG. 9 is a flowchart illustrating procedures of the optimization processing.

First, the PC 100 selects one color conversion pattern from among the plurality of the color conversion patterns used in the print job (step S201).

Next, the PC 100 selects another color conversion pattern from among the plurality of the color conversion patterns used in the print job (step S202).

Next, the PC 100 compares the color saturation values after printing which are estimated with respect to the color conversion profiles and determines whether the two color conversion profiles coincide with or approximate to each other (step S203). More specifically, the PC 100 reads out the color saturation values 420 after printing estimated for the same input color value with respect to the color conversion profiles 400 of the two color conversion patterns selected by the processing in steps S201 and S202 and calculates a color difference of the two color saturation values. Subsequently, the PC 100 determines whether an average value of color differences of a plurality of the input color values is equal to or less than a predetermined threshold value and determines that the two color conversion profiles 400 coincide with or approximate to each other when the average value of the color differences is equal to or less than the threshold value. The threshold value is a reference value for determining whether the color conversion profiles 400 coincide with or approximate to each other and is determined, for example, according to an allowable level set to the color verification as illustrated in FIG. 10.

When the color conversion profiles do not coincide with or approximate to each other (NO in step S203), the PC 100 determines that the color conversion patterns are non-identical or dissimilar to each other (step S204) and shifts to the processing in step S207.

On the other hand, when the color conversion profiles coincide with or approximate to each other (YES in step S203), the PC 100 compares the color saturation values after printing which are estimated with respect to the color correction tables and determines whether the two color correction tables coincide with or approximate to each other (step S205). More specifically, the PC 100 reads out the color saturation values 520 after printing estimated for the same input color value with respect to the color correction tables 500 of the two color conversion patterns selected by the processing in steps S201 and S202 and calculates a color difference of the two color saturation values. Subsequently, the PC 100 determines whether an average value of color differences of a plurality of the input color values are equal to or less than the above-described threshold value and determines that the two color correction tables 500 coincide with or approximate to each other when the average value of the color differences is equal to or less than the threshold value.

When the color correction tables 500 do not coincide with or approximate to each other (NO in step S205), the PC 100 determines that the color conversion patterns are non-identical or dissimilar to each other (step S204) and shifts to the processing in step S207. On the other hand, when the color correction tables 500 coincide with or approximate to each other (YES in step S205), the PC 100 determines that the color conversion patterns are identical or similar to each other (step S206).

Next, the PC 100 determines whether another color conversion pattern exists (step S207). More specifically, the PC 100 determines whether the color conversion pattern which is not yet completed comparison with the color conversion pattern selected by the processing in step S201 exists in the plurality of the color conversion patterns.

When the other color conversion pattern exists (YES in step S207), the PC 100 returns to the processing in step S202. Subsequently, the PC 100 repeats the processing in step S202 and subsequent steps until there are no other color conversion patterns.

On the other hand, when the other color conversion pattern does not exist (NO in step S207), the PC 100 determines whether comparison is completed on the all color conversion patterns (step S208). More specifically, the PC 100 determines whether the comparison is completed on all of the plurality of the color conversion patterns.

When the comparison is not completed on the all color conversion patterns (NO in step S208), the PC 100 returns to the processing in step S201. Subsequently, the PC 100 repeats the processing in step S201 and subsequent steps until the comparison is completed on the all color conversion patterns.

On the other hand, when the comparison is completed on the all color conversion patterns (YES in step S208), the PC 100 displays a color verification pattern (step S209) and terminates the processing. More specifically, the PC 100 displays a color verification pattern display screen 600 (see FIG. 11) for notifying a user of the color conversion pattern for performing the color verification as a recommended pattern on the display unit 103.

FIG. 11 illustrates an example of the color verification pattern display screen 600. In FIG. 11, necessities of the color verification are indicated for the first to the fourth color conversion patterns illustrated in FIG. 8. In FIG. 11, a "profile A" of the first color conversion pattern and a "profile A'" of the second color conversion pattern approximate to each other, and the "color correction table W" and the "color correction table X" also approximate to each other. Further, the "color correction table Y" of the third color conversion pattern and the "color correction table Z" of the fourth color conversion pattern approximate to each other.

As illustrated in FIG. 11, the color verification pattern display screen 600 displays the color conversion pattern subjected to the color verification and the color conversion pattern omitted from the color verification in a distinguishable manner. Specifically, the first color conversion pattern and the second color conversion pattern are the identical or the similar color conversion patterns, so that the color verification pattern display screen 600 displays that the color verification is necessary for the first color conversion pattern and the color verification is not necessary for the second color conversion pattern. Similarly, the third color conversion pattern and the fourth color conversion pattern are the identical or the similar color conversion patterns, so that the color verification pattern display screen 600 displays that the color verification is necessary for the third color conversion pattern and the color verification is not necessary for the fourth color conversion pattern. A user of the PC 100 can approve execution of the color verification with reference to the color verification pattern display screen 600. In this regard, the processing in step S209 may be omitted.

As described above, according to the processing in the flowchart illustrated in FIG. 9, the color saturation values after printing which are estimated with respect to the color conversion profiles and the color correction tables are compared, and the two or more color conversion patterns are calculated of which the color conversion profiles and the color correction tables both coincide with or approximate to each other. In this regard, the two or more color conversion patterns of which the color conversion profiles and the color correction tables both coincide with or approximate to each other are stored in the storage unit 102 so as to omit the processing for comparing the color saturation values in the next and subsequent optimization processing.

According to the present embodiment, regarding the two or more color conversion patterns of which the color conversion profiles and the color correction tables both coincide with or approximate to each other, the color verification is performed by the one color conversion pattern, and the remaining color conversion patterns are omitted from the color verification. According to such a configuration, the number of times of the color verification is minimized. Accordingly, the processing time is shortened, and the number of waste sheets is reduced.

Further, according to the present embodiment, coincident or approximation of the color conversion profiles to each other and the color correction tables to each other are determined based on the color saturation values after printing which are estimated with respect to the color conversion profiles and the color correction tables. Thus, whether the color conversion profiles coincide with or approximate to each other and whether the color correction tables coincide with or approximate to each other can be accurately determined by a reference close to an actual print result. Therefore, for example, compared to a case that grouping of the color conversion pattern is performed based on a type of a sheet, grouping can be accurately performed on the color conversion patterns, and accordingly the number of times of the color verification can be minimized while maintaining the print quality.

When a color verification result of the one color conversion pattern in the two or more color conversion patterns is defective, the color correction table of the one color conversion pattern is adjusted based on the color verification result. Further, regarding the color correction table of the remaining color conversion patterns, a difference from the color correction table before adjustment of the one color conversion pattern is calculated in advance, and a new color correction table is generated by reflecting the difference in the color correction table after adjustment of the one color conversion pattern. The control unit 101 of the PC 100 functions as an adjustment unit for adjusting the color correction table and a generation unit for generating a new color correction table by executing a corresponding program.

Next, a generation method of the color conversion profile 400 and the color correction table 500 is described with reference to FIG. 12. A case when the color correction table 500 is generated is described below as an example.

FIG. 12 is a flowchart illustrating procedures of color correction table generation processing executed by the printer 200.

First, the printer 200 prints a color chart on a predetermined sheet without executing the color conversion processing (step S301). Next, the printer 200 performs colorimetry on the color chart (step S302).

Next, the printer 200 generates the LUT 510 (step S303). More specifically, the printer 200 generates the LUT 510 for converting the input color value so that the colorimetry value (L*a*b* value) obtained by performing the colorimetry on the color chart coincides with the target value. A technique for performing colorimetry on the color chart and generating the LUT itself is a known technique, and thus detailed descriptions thereof are omitted.

Next, the printer 200 estimates the color saturation value 520 after printing (step S304). More specifically, the printer 200 converts the input color value by applying the LUT 510 generated by the processing in step S303 and then calculates the color saturation value 520 after printing estimated with respect to the input color value by applying the color value after conversion to a relational expression between the color value (CMYK value) and the colorimetry value (L*a*b* value) obtained by performing the colorimetry on the color chart by the processing in step S302. For example, a first color value (CMYK value) as the input color value is converted into a second color value (CMYK value) by applying the LUT 510, and then the second color value is applied to the above-described relational expression to calculate the color saturation value (L*a*b* value) after printing estimated with respect to the first color value. The color saturation value 520 after printing does not always coincide with the above-described target value.

Subsequently, the printer 200 includes the color saturation value 520 after printing estimated with respect to the LUT 510 in the color correction table 500 (step S305) and terminates the processing.

As described above, according to the processing in the flowchart illustrated in FIG. 12, first, the color chart is printed without executing the color conversion processing, and the LUT 510 is generated from the colorimetry result of the color chart. Subsequently, the color saturation value 520 after printing is estimated with respect to the LUT 510 using the colorimetry result of the color chart, and the estimated color saturation value 520 after printing is included in the color correction table 500.

When the color conversion profile 400 is generated, the color conversion processing is executed by applying the color correction table 500 generated in advance, and then the color chart is printed. Except for this point, processing for generating the color conversion profile 400 itself is similar to the processing for generating the color correction table 500, and thus detailed descriptions thereof are omitted.

(Modification)

Figure 13:
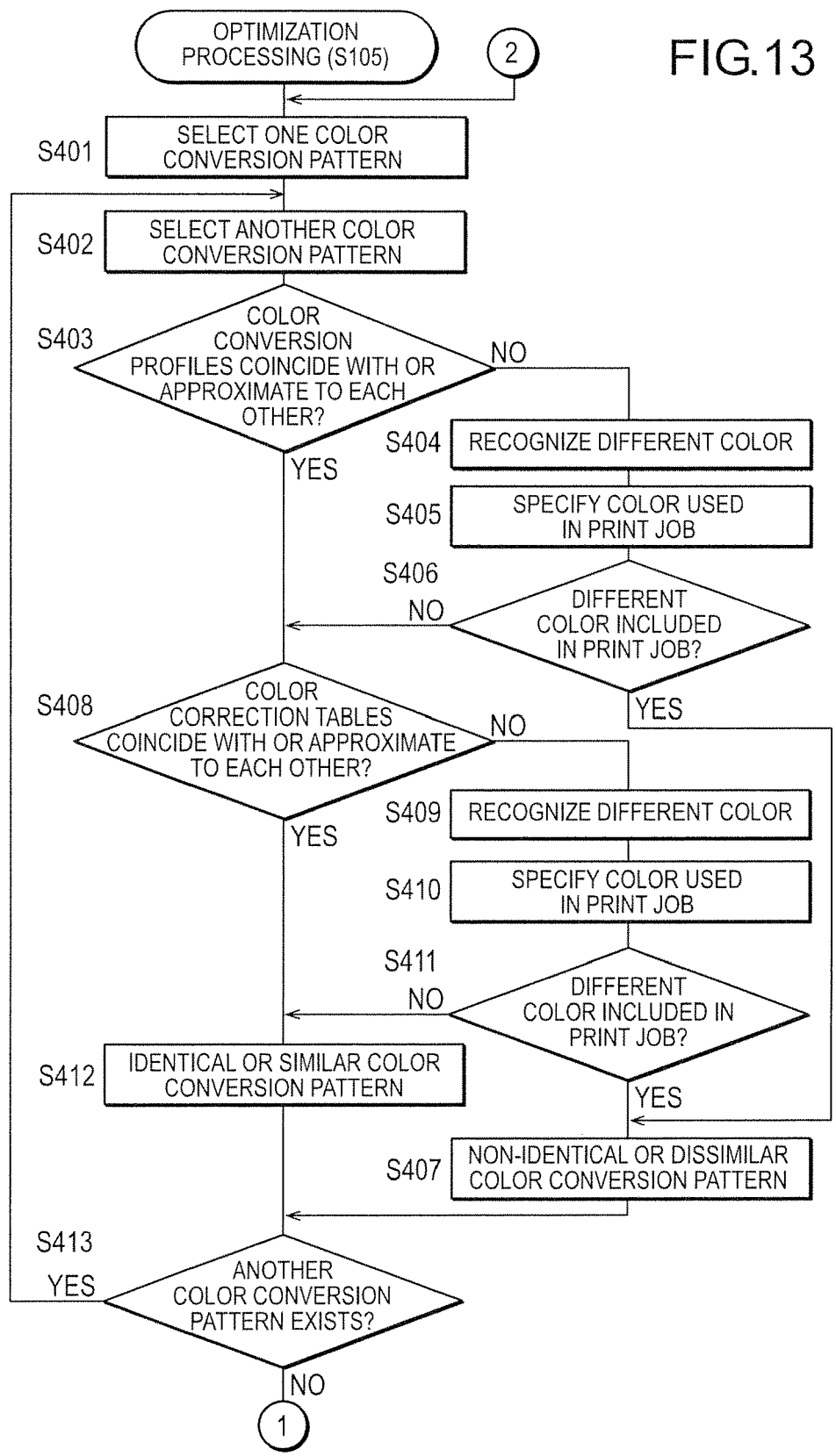
FIG. 13 is a flowchart illustrating procedures of optimization processing according to a modification.
Figure 14:
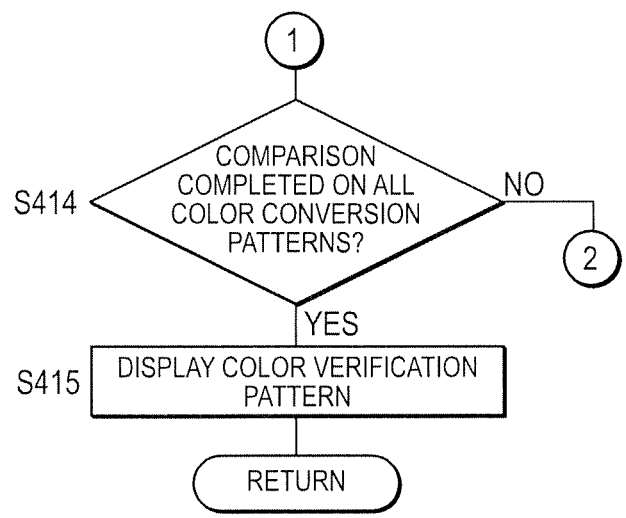
FIG. 14 is a flowchart following to FIG. 13.

Next, a modification of the present embodiment is described with reference to FIG. 13 and FIG. 14. FIG. 13 and FIG. 14 are flowcharts illustrating procedures of optimization processing according to the modification.

Processing in steps S401 to S403 is similar to the processing in steps S201 to S203 in FIG. 9, and thus descriptions thereof are omitted.

In the processing in step S403, when the color conversion profiles do not coincide with or approximate to each other (NO in step S403), the PC 100 recognizes the color value which is different between the color conversion profiles (step S404). More specifically, the PC 100 recognizes the color value of which a color difference of the color saturation values after printing between the two color conversion profiles exceeds a threshold value from the comparison result of the color saturation values after printing.

Next, the PC 100 analyzes the print job and specifies the color values used in the print job (step S405).

Next, the PC 100 determines whether the color value which is different between the color conversion profiles and color value around the relevant color value are included in the color values used in the print job (step S406). More specifically, the PC 100 determines whether the color value recognized by the processing in step S404 and a color value within a predetermined color difference range from the relevant color value on a color space are included in the color values specified by the processing in step S405.

When the color value which is different between the color conversion profiles and the color value around the relevant color value are included in the color values used in the print job (YES in step S406), the PC 100 determines that the color conversion patterns are non-identical or dissimilar to each other (step S407) and shifts to the processing in step S413.

On the other hand, when the color value which is different between the color conversion profiles and the color value around the relevant color value are not included in the color values used in the print job (NO in step S406), the PC 100 determines whether the color correction tables coincide with or approximate to each other (step S408).

When the color correction tables coincide with or approximate to each other (YES in step S408), the PC 100 determines that the two color conversion patterns are identical or similar to each other (step S412). On the other hand, when the color correction tables do not coincide with or approximate to each other (NO in step S408), the PC 100 recognizes the color value which is different between the color correction tables (step S409). More specifically, the PC 100 recognizes the color value of which a color difference of the color saturation values after printing between the two color correction tables exceeds the threshold value from the comparison result of the color saturation values after printing.

Next, the PC 100 analyzes the print job and specifies the color values used in the print job (step S410).

Next, the PC 100 determines whether the color value which is different between the color correction tables and the color value around the relevant color value are included in the color values used in the print job (step S411). More specifically, the PC 100 determines whether the color value recognized by the processing in step S409 and the color value within the predetermined color difference range from the relevant color value on the color space are included in the color values specified by the processing in step S410.

When the color value which is different between the color correction tables and the color value around the relevant color value are included in the color values used in the print job (YES in step S411), the PC 100 determines that the color conversion patterns are non-identical or dissimilar to each other (step S407) and shifts to the processing in step S413.

On the other hand, when the color value which is different between the color correction tables and the color value around the relevant color value are not included in the color values used in the print job (NO in step S411), the PC 100 determines that the color conversion patterns are identical or similar to each other (step S412). Processing in step S413 and subsequent steps is similar to the processing in step S207 and subsequent steps in FIG. 9, and thus descriptions thereof are omitted.

As described above, according to the processing in the flowcharts illustrated in FIG. 13 and FIG. 14, when the color conversion profiles do not coincide with or approximate to each other, the color value which is different between the color conversion profiles is recognized, and also the color values used in the print job are specified. Further, when the color value which is different between the color conversion profiles and the color value around the relevant color value are not included in the color values used in the print job, it is determined that the color conversion profiles coincide with or approximate to each other.

Similarly, when the color correction tables do not coincide with or approximate to each other, the color value which is different between the color correction tables is recognized, and also the color values used in the print job are specified. Further, when the color value which is different between the color correction tables and the color value around the relevant color value are not included in the color values used in the print job, it is determined that the color correction tables coincide with or approximate to each other.

According to such a configuration, the color conversion patterns which are determined as coinciding with or approximating to each other can be increased without deteriorating the print quality. Accordingly, grouping of the color conversion patterns can be performed more efficiently.

The control unit 101 of the PC 100 functions as first and second recognition units, first and second specification units, and third and fourth determination units by executing corresponding programs. The first recognition unit recognizes the color value of which the color saturation values after printing are different between the color conversion profiles, and the second recognition unit recognizes the color value of which the color saturation values after printing are different between the color correction tables. The first and the second specification units specify the color values used in the print job. The third determination unit determines whether the color value recognized by the first recognition unit and a color value around the relevant color value are included in the color values specified by the first specification unit. The fourth determination unit determines whether the color value recognized by the second recognition unit and a color value around the relevant color value are included in the color values specified by the second specification unit.

Second Embodiment

Next, a second embodiment of the present invention is described with reference to FIG. 15 to FIG. 17. The present embodiment is an embodiment in which the above-described color verification processing is executed by the printer 200.

Figure 15:
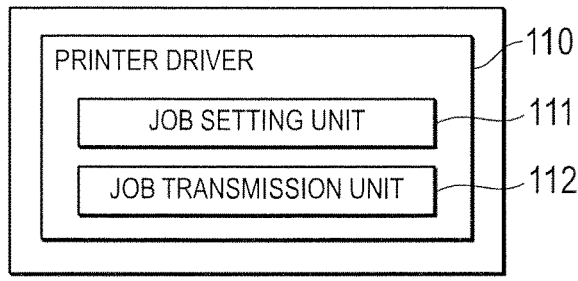
FIG. 15 illustrates contents stored in a storage unit of a PC according to a second embodiment of the present invention.
Figure 16:
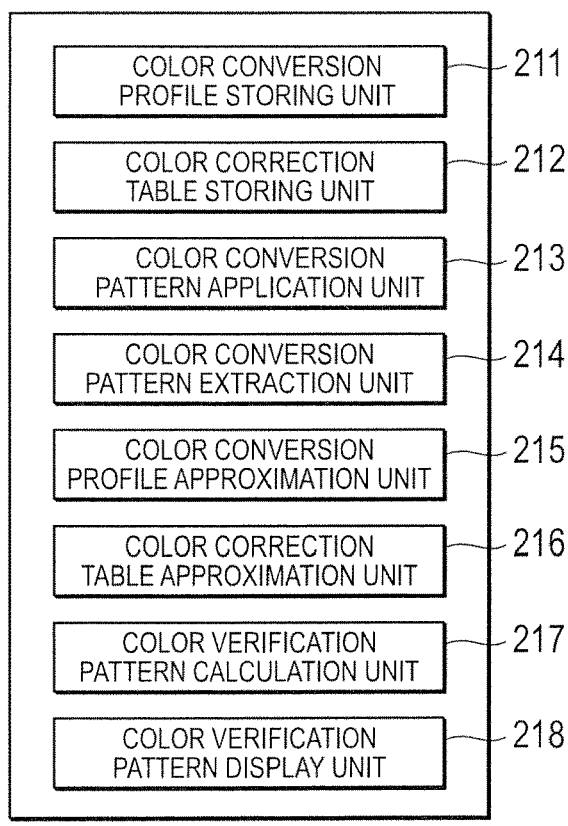
FIG. 16 illustrates contents stored in a storage unit of a printer.

FIG. 15 illustrates contents stored in the storage unit 102 of the PC 100 according to the second embodiment of the present invention, and FIG. 16 illustrates contents stored in the storage unit 202 of the printer 200. Except for a point that the printer 200 as the color verification optimization apparatus executes the color verification processing, the configuration of the printing system according to the second embodiment is similar to that of the first embodiment, and thus detailed descriptions thereof are omitted.

As illustrated in FIG. 15, the storage unit 102 of the PC 100 stores the printer driver 110, and the printer driver 110 includes programs corresponding to the job setting unit 111 and the job transmission unit 112.

As illustrated in FIG. 16, the storage unit 202 of the printer 200 includes the color conversion profile storing unit 211 and the color correction table storing unit 212. The storage unit 202 stores programs corresponding to the color conversion pattern application unit 213, a color conversion pattern extraction unit 214, a color conversion profile approximation unit 215, a color correction table approximation unit 216, a color verification pattern calculation unit 217, and a color verification pattern display unit 218.

Figure 17:
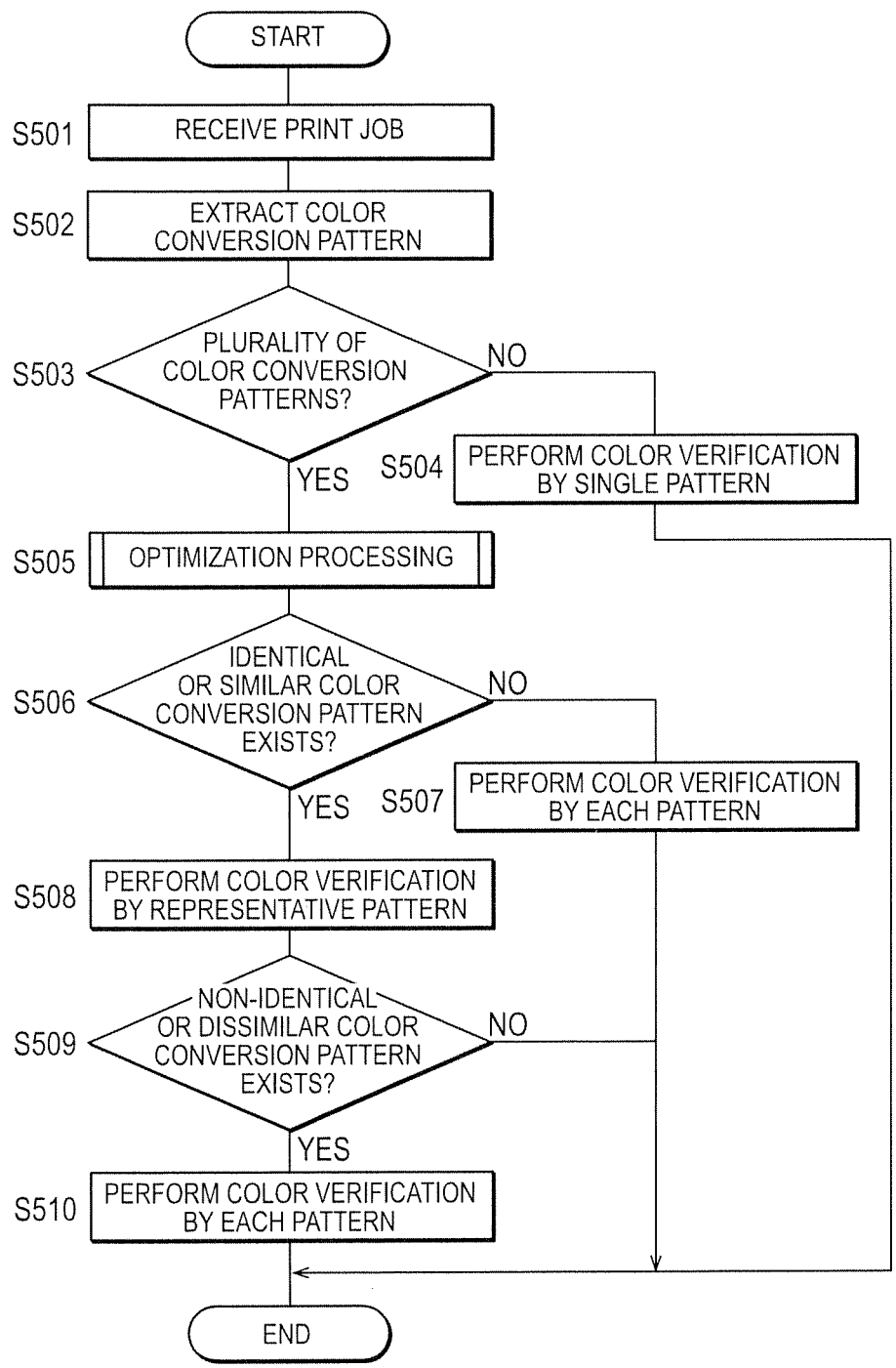
FIG. 17 is a flowchart illustrating procedures of color verification processing executed by the printer.

FIG. 17 is a flowchart illustrating procedures of the color verification processing executed by the printer 200.

First, the printer 200 receives a print job transmitted from the PC 100 (step S501). Next, the printer 200 analyzes the print setting of the print job and extracts the color conversion pattern used in the print job (step S502).

Next, the printer 200 determines whether a plurality of the color conversion patterns are extracted (step S503). When a plurality of the color conversion patterns are not extracted (NO in step S503), the printer 200 performs the color verification by a single pattern (step S504) and terminates the processing. More specifically, the printer 200 executes the color conversion processing by sequentially applying the color conversion profile and the color correction table of one color conversion pattern used in the print job and prints a color chart. Further, the printer 200 performs colorimetry on the color chart and confirms whether a color difference between a colorimetry value and a target value falls within a standard.

On the other hand, when a plurality of the color conversion patterns are extracted in the processing in step S503 (YES in step S503), the printer 200 executes the optimization processing (step S505). More specifically, the printer 200 executes the optimization processing for calculating two or more color conversion patterns of which the color conversion profiles and the color correction tables both coincide with or approximate to each other from among the plurality of the color conversion patterns used in the print job. The optimization processing in step S505 is similar to the optimization processing illustrated in FIG. 9, and thus detailed descriptions thereof are omitted.

Next, the printer 200 determines whether identical or the similar color conversion patterns exist (step S506). More specifically, the printer 200 determines whether the two or more color conversion patterns of which the color conversion profiles and the color correction tables both coincide with or approximate to each other are calculated by the optimization processing in step S505.

When the identical or the similar color conversion patterns do not exist (NO in step S506), the printer 200 performs the color verification by each pattern (step S507) and terminates the processing. More specifically, the printer 200 performs the color verification by each of a plurality of the color conversion patterns used in the print job and terminates the processing.

On the other hand, when the identical or the similar color conversion patterns exist (YES in step S506), the printer 200 performs the color verification by a representative pattern (step S508). More specifically, the printer 200 regards one color conversion pattern in the two or more identical or similar color conversion patterns as the representative pattern and performs the color verification by the representative pattern.

Next, the printer 200 determines whether a non-identical or dissimilar color conversion pattern exists (step S509). More specifically, the printer 200 determines whether the color conversion pattern other than the two or more identical or similar color conversion patterns exists in the plurality of the color conversion patterns used in the print job.

When the non-identical or the dissimilar color conversion pattern does not exist (NO in step S509), the printer 200 terminates the processing. On the other hand, when the non-identical or the dissimilar color conversion pattern exists (YES in step S509), the printer 200 performs the color verification by each pattern (step S510) and terminates the processing.

As described above, according to the processing in the flowchart illustrated in FIG. 17, the color conversion pattern used in the print job is extracted, and when there are a plurality of the extracted color conversion patterns, the two or more identical or similar color conversion patterns are calculated. Subsequently, the color verification is performed by one color conversion pattern in the two or more color conversion patterns, and the remaining color conversion patterns are omitted from the color verification. According to such a configuration, the number of times of the color verification is minimized.

The present invention is not limited to the above-described embodiments, and can be variously modified within the scope of the appended claims.

Figure 18A:
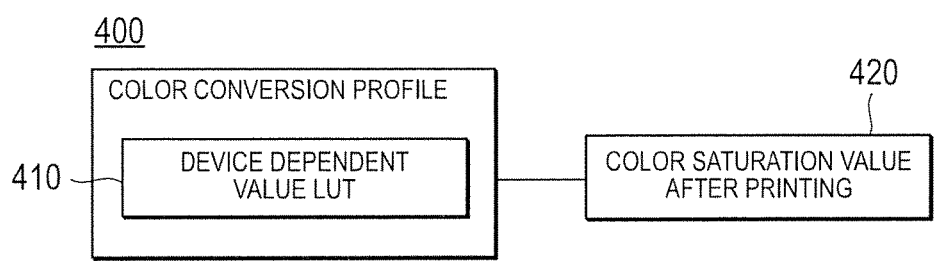
FIG. 18A illustrates a schematic configuration of a color conversion profile according to the modification.
Figure 18B:
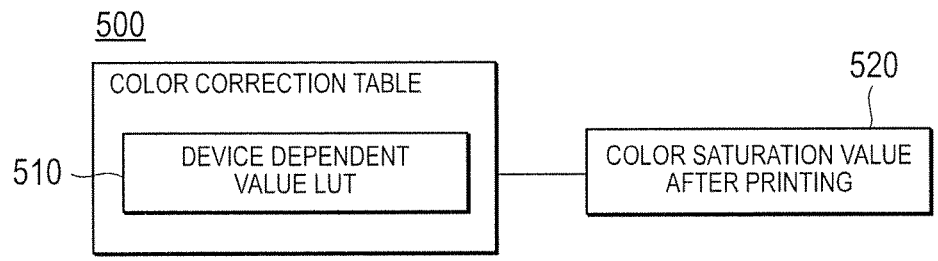
FIG. 18B illustrates a schematic configuration of a color correction table according to the modification.

For example, according to the above-described first and second embodiments, the color saturation values after printing estimated with respect to the color conversion profiles and the color correction tables are included in the color conversion profile and the color correction table. However, as illustrated in FIG. 18A and FIG. 18B, the color saturation values after printing estimated with respect to the color conversion profiles and the color correction tables may be stored in the storage unit in association with the color conversion profile and the color correction table without being included in the color conversion profile and the color correction table.

Further, according to the above-described first and second embodiments, when coincident or approximation of the color conversion profiles to each other or the color correction tables to each other is determined, the color saturation values after printing estimated with respect to the color conversion profiles and the color correction tables are compared. However, when coincident or approximation of the color conversion profiles to each other or the color correction tables to each other is determined, settings regarding the color conversion parameters may be compared in addition to the color saturation values after printing. In this case, when the settings regarding the color conversion parameters are different, it is determined that the color conversion profiles or the color correction tables do not coincide with or approximate to each other.

Further, according to the above-described first and second embodiments, when a plurality of the color conversion patterns used in the print job are extracted, the optimization processing is executed, and the color verification pattern display screen 600 is displayed. However, when the color conversion pattern used in the print job is extracted only one, and the optimization processing is not executed, the color verification pattern display screen 600 may be displayed to notify a user of the one color conversion pattern.

Further, according to the above-described first and second embodiments, the printer 200 includes the colorimetry unit 205. However, the colorimetry unit may be provided separately from the printer. For example, a colorimeter may be connected to the PC 100, and the PC 100 may generate the color conversion profile and the color correction table.

Units and methods for performing various types of processing in the printing system according to the above-described first and second embodiments can be implemented by either of a dedicated hardware circuit or a programmed computer. The abovementioned program may be provided, for example, by a computer readable recording medium such as a compact disc read only memory (CD-ROM) or online via a network such as the Internet. In this case, the program recorded in the computer readable recording medium is normally transferred to and stored in a storage unit such as a hard disk. Further, the above mentioned program may be provided as a stand-alone application software or may be incorporated in software of the apparatus as a function of the printing system.

What is claimed is:

1. A non-transitory computer readable recording medium storing a color verification optimization program executed by a controller of a color verification optimization apparatus to optimize verification of color conversion processing using a color conversion pattern which is a combination of a color conversion profile for converting a color value of print data into a color value specific to a printing apparatus and a color correction table for correcting a color value converted by applying the color conversion profile, the program causing the controller to execute:

(a) analyzing a setting of a print job and extracting a plurality of color conversion patterns used in the print job;
   (b) determining whether a color conversion profile of one of the extracted color conversion patterns coincides with or approximates another color conversion profile of each of the remainder of the extracted color conversion patterns by comparing color saturation values after printing which are estimated with respect to the color conversion profiles;
   (c) determining whether a color correction table of one of the extracted color conversion patterns coincides with or approximates another color correction table of each of the remainder of the extracted color conversion patterns by comparing color saturation values after printing which are estimated with respect to the color correction tables;
   (d) obtaining the color conversion patterns in which the color conversion profiles and the color correction tables both coincide with or approximate each other based on determination results in the step (b) and the step (c); and
   (e) executing the verification by one or more of the obtained color conversion patterns and omitting the verification with respect to the remainder of the obtained color conversion patterns.

2. The non-transitory computer readable recording medium as claimed in claim 1, wherein
   the controller further executes, between the step (d) and the step (e):
   (f) displaying the one obtained color conversion pattern and the remainder of the obtained color conversion patterns in a distinguishable manner.

3. The non-transitory computer readable recording medium as claimed in claim 1, wherein
   the controller further executes:
   (g) when determining in the step (b) that the color conversion profile does not coincide with or approximate the another color conversion profile, recognizing a color value of which the color saturation values after printing are different between the color conversion profile and the another color conversion profile;
   (h) specifying color values used in the print job;
   (i) determining whether the color value recognized in the step (g) and a color value around the relevant color value are included in the color values specified in the step (h), and
   when determining in the step (i) that the color value recognized in the step (g) and the color value around the relevant color value are not included in the color values specified in the step (h), determining that the color conversion profile coincides with or approximates the another color conversion profile.

4. The non-transitory computer readable recording medium as claimed in claim 1, wherein
   the controller further executes:
   (j) when determining in the step (c) that the color correction table does not coincide with or approximate the another color correction table, recognizing a color value of which the color saturation values after printing are different between the color correction table and the another color correction table;
   (k) specifying color values used in the print job;
   (l) determining whether the color value recognized in the step (j) and a color value around the relevant color value are included in the color values specified in the step (k), and
   when determining in the step (l) that the color value recognized in the step (j) and the color value around the relevant color value are not included in the color values specified in the step (k), determining that the color correction table coincides with or approximates the another color correction table.

5. The non-transitory computer readable recording medium as claimed in claim 1, wherein
   the color conversion profiles and the color correction tables are associated with settings regarding color conversion parameters, and
   the controller determines, in the step (b) and the step (c), whether the settings regarding the color conversion parameters coincide with each other, in addition to comparison of the color saturation values.

6. The non-transitory computer readable recording medium as claimed in claim 1, wherein
   the controller further executes:
   (m) in a case where a verification result of the one obtained color conversion pattern is defective in the step (e), adjusting the color correction table of the one obtained color conversion pattern based on the verification result; and
   (n) reflecting a difference between the color correction table before adjustment of the one obtained color conversion pattern and the color correction table of the remainder of the obtained color conversion patterns in the color correction table adjusted in the step (m) and generating a new color correction table of the remainder of the obtained color conversion patterns.

7. The non-transitory computer readable recording medium as claimed in claim 1, wherein
   the controller determines a threshold value for determining whether the color conversion profile coincides with or approximates the another color conversion profile in the step (b) or determining whether the color correction table coincides with or approximates the another color correction table in the step (c), according to an allowable level set to the verification.

8. The non-transitory computer readable recording medium as claimed in claim 1, wherein
the controller further executes:
(o) storing the color conversion patterns obtained in the step (d) to omit the step (b) and the step (c) in a case where a new print job is executed.

9. A color verification optimization apparatus optimizing verification of color conversion processing using a color conversion pattern which is a combination of a color conversion profile for converting a color value of print data into a color value specific to a printing apparatus and a color correction table for correcting a color value converted by applying the color conversion profile, the apparatus comprising:
a controller that:
analyzes a setting of a print job and extracts a plurality of the color conversion patterns used in the print job;
determines whether a color conversion profile of one of the extracted color conversion patterns coincides with or approximates another color conversion profile of each of the remainder of the extracted color conversion patterns by comparing color saturation values after printing which are estimated with respect to the color conversion profiles;
determines whether a color correction table of one of the extracted color conversion patterns coincides with or approximates another color correction table of each of the remainder of the extracted color conversion patterns by comparing color saturation values after printing which are estimated with respect to the color correction tables;
obtains the color conversion patterns in which the color conversion profiles and the color correction tables both coincide with or approximate each other based on determination results by the controller; and
executes the verification by one or more of the obtained color conversion patterns and omits the verification with respect to the remainder of the obtained color conversion patterns.

10. The color verification optimization apparatus as claimed in claim 9 further comprising:
a display that displays the one obtained color conversion pattern and the remainder of the obtained color conversion patterns in a distinguishable manner.

11. The color verification optimization apparatus as claimed in claim wherein the controller:
recognizes, when determining that the color conversion profile does not coincide with or approximate the another color conversion profile, a color value of which the color saturation values after printing are different between the color conversion profile and the another color conversion profile;
specifies color values used in the print job;
determines whether the recognized color value and a color value around the relevant color value are included in the specified color values, and
when determining that the recognized color value and the color value around the relevant color value are not included in the specified color values, determines that the color conversion profile coincides with or approximates the another color conversion profile.

12. The color verification optimization apparatus as claimed in claim 9, wherein the controller:

recognizes, when determining that the color correction table does not coincide with or approximate the another color correction table, a color value of which the color saturation values after printing are different between the color correction tables;
specifies color values used in the print job;
determines whether the recognized color value and a color value around the relevant color value are included in the specified color values, and
when determining that the recognized color value and the color value around the relevant color value are not included in the specified color values, determines that the color correction table coincides with or approximates the another color correction table.

13. The color verification optimization apparatus as claimed in claim 9, wherein
the color conversion profiles and the color correction tables are associated with settings regarding color conversion parameters, and
the controller determines whether the settings regarding the color conversion parameters coincide with each other, in addition to comparison of the color saturation values.

14. The color verification optimization apparatus as claimed in claim 9, wherein the controller:
adjusts, in a case where a verification result of the one obtained color conversion pattern is defective, the color correction table of the one obtained color conversion pattern based on the verification result; and
reflects a difference between the color correction table before adjustment of the one obtained color conversion pattern and the color correction table of the remainder of the obtained color conversion patterns in the adjusted color correction table and generates a new color correction table of the remainder of the obtained color conversion patterns.

15. The color verification optimization apparatus as claimed in claim 9, wherein
the controller determines a threshold value for determining whether the color conversion profile coincides with or approximates the another color conversion profile or determining whether the color correction table coincides with or approximates the another color correction table, according to an allowable level set to the verification.

16. The color verification optimization apparatus as claimed in claim 9 further comprising:
a storage that stores the obtained color conversion patterns to omit processes by the controller in a case where a new print job is executed.

17. A color verification optimization method for optimizing verification of color conversion processing by a controller of a color verification optimization apparatus, the color conversion processing using a color conversion pattern which is a combination of a color conversion profile for converting a color value of print data into a color value specific to a printing apparatus and a color correction table for correcting a color value converted by applying the color conversion profile, the method comprising:
(a) analyzing, by the controller, a setting of a print job and extracting a plurality of the color conversion patterns used in the print job;
(b) determining, by the controller, whether a color conversion profile of one of the extracted color conversion patterns coincides with or approximates another color conversion profile of each of the remainder of the extracted color conversion patterns by comparing color saturation values after printing which are estimated with respect to the color conversion profiles;

(c) determining, by the controller, whether a color correction table of one of the extracted color conversion patterns coincides with or approximates another color correction table of each of the remainder of the extracted color conversion patterns by comparing color saturation values after printing which are estimated with respect to the color correction tables;

(d) obtaining, by the controller, the color conversion patterns in which the color conversion profiles and the color correction tables both coincide with or approximate each other based on determination results in the step (b) and the step (c); and (e) executing, by the controller, the verification by one or more of the obtained color conversion patterns and omitting the verification with respect to the remainder of the obtained color conversion patterns.

* * * * *